United States Patent
Jeon et al.

(10) Patent No.: US 9,013,370 B2
(45) Date of Patent: Apr. 21, 2015

(54) DISPLAY SYSTEM FOR MEETING ROOM AND CONTROL METHOD THEREOF

(75) Inventors: Jin-young Jeon, Seoul (KR); Sang-woong Hwang, Yongin-si (KR); Jee-sun Yoon, Seoul (KR); Ji-young Kwahk, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 559 days.

(21) Appl. No.: 12/910,475

(22) Filed: Oct. 22, 2010

(65) Prior Publication Data

US 2011/0102301 A1    May 5, 2011

(30) Foreign Application Priority Data

Oct. 30, 2009 (KR) .................. 10-2009-0104152

(51) Int. Cl.
| | |
|---|---|
| G09G 5/00 | (2006.01) |
| G09G 3/36 | (2006.01) |
| H04H 40/00 | (2008.01) |
| H04W 4/00 | (2009.01) |
| G03B 21/00 | (2006.01) |
| H04N 5/775 | (2006.01) |
| H04N 21/41 | (2011.01) |
| H04N 21/422 | (2011.01) |

(52) U.S. Cl.
CPC ............... *G03B 21/00* (2013.01); *H04N 5/775* (2013.01); *H04N 21/4122* (2013.01); *H04N 21/42202* (2013.01)

(58) Field of Classification Search
CPC ............. H04N 5/58; H04N 5/57; G09G 5/12; G09G 5/00; G09G 2360/144
USPC ............ 345/1.1–3.1, 102; 455/3.06, 454–463
See application file for complete search history.

(56) References Cited

U.S. PATENT DOCUMENTS

| | | | |
|---|---|---|---|
| 7,016,011 B2 * | 3/2006 | De Haan | 352/43 |
| 7,236,154 B1 * | 6/2007 | Kerr et al. | 345/102 |
| 2003/0224807 A1 * | 12/2003 | Sinha et al. | 455/463 |
| 2004/0036697 A1 * | 2/2004 | Kim et al. | 345/617 |
| 2005/0206788 A1 * | 9/2005 | Eves et al. | 348/602 |
| 2006/0143321 A1 | 6/2006 | Yoon | |
| 2008/0068566 A1 | 3/2008 | Denoue et al. | |
| 2008/0214104 A1 * | 9/2008 | Baumert et al. | 455/3.06 |

FOREIGN PATENT DOCUMENTS

| | | |
|---|---|---|
| JP | 2008-077087 | 4/2008 |
| KR | 1020060065748 | 6/2006 |
| WO | WO 2008/142603 | 11/2008 |

OTHER PUBLICATIONS

Chinese Office Action dated Jun. 30, 2014 issued in counterpart Application No. 201080049357.9.

* cited by examiner

*Primary Examiner* — Vijay Shankar
*Assistant Examiner* — Amit Chatly
(74) *Attorney, Agent, or Firm* — The Farrell Law Firm, P.C.

(57) ABSTRACT

A display system and a method of controlling the same are provided The display system includes a display apparatus which displays an image based on a received image signal; at least one peripheral device which adjusts an environment peripheral to the display apparatus; at least one state adjusting device which adjusts a state of the peripheral device; and a first user terminal which controls the corresponding state adjusting device such that the state of the peripheral device is adjusted to a preset initial state, when a connection with the display apparatus is made, and transmits the image signal to the display apparatus. Accordingly, the display system is capable of being operated automatically adaptively to a meeting environment.

31 Claims, 9 Drawing Sheets

FIG. 9

DISPLAY SYSTEM FOR MEETING ROOM AND CONTROL METHOD THEREOF

PRIORITY

This application claims priority under 35 U.S.C. §119(a) to an application filed in the Korean Intellectual Property Office on Oct. 30, 2009 and assigned Patent Application Ser. No. 10-2009-0104152, the contents of which is incorporated herein by reference.

BACKGROUND OF THE INVENTION

1. Field of the Invention

The present invention relates generally to a display system and a method of controlling the display system, and more particularly, to a display system and a method of controlling the display system, which is capable of being operated adaptively to a meeting environment.

2. Description of the Related Art

A display system displays an image by using a display apparatus, e.g., a projector, provided in a meeting room to allow participants conduct the meeting while commonly watching the displayed image. In the display system, a user terminal such as a desktop Personal Computer (PC) or a laptop PC may be used as a source input device for providing an image source as input into the display apparatus.

Further, in addition to the user terminal for providing the image signal as input into the display apparatus, the display system enables intercommunication to be performed between the user terminals of the participants in the meeting to allow the participants to conduct the meeting while mutually sharing contents such as data necessary for the meeting.

Meanwhile, peripheral devices, such as lighting devices, (e.g., electric lamps) and light-blocking objects (e.g., curtains), may be used in a meeting room equipped with the display system. Accordingly, it is necessary to adaptively control such peripheral devices in the meeting environment in order to maintain convenience and silence within the meeting environment.

When the meeting contents such as data are shared between the participants in the meeting, it is also necessary to automatically adaptively control the environment for intercommunication between the user terminals for sharing the data.

SUMMARY OF THE INVENTION

Accordingly, embodiments of the present invention provide a display system and a method of controlling the same, capable of being operated adaptively to a meeting environment.

According to an embodiment of the present invention, a display system is provided, which includes a display apparatus for displaying an image based on a received image signal; a peripheral device for adjusting an environment peripheral to the display apparatus; a state adjusting device for adjusting a state of the peripheral device; and a first user terminal for, when a connection with the display apparatus is established, controlling the state adjusting device such that the state of the peripheral device is adjusted to a preset initial state, and for transmitting the image signal to the display apparatus.

The system may further include at least one second user terminal for connecting to the first user terminal through a wireless network, and the first user terminal establishes a connection with the second user terminal, when the connection with the display apparatus is established.

According to another embodiment of the present invention, a method for controlling a display system by using a display apparatus which displays an image based on a received image signal is provided, the method including determining whether a connection between a first user terminal and the display apparatus has been established; controlling a state adjusting device such that a state of a peripheral device for adjusting an environment peripheral to the display apparatus is adjusted to a preset initial state, upon determining that the connection between the first user terminal and the display apparatus has been established; and transmitting the image signal from the first user terminal to the display apparatus.

The method may further include establishing a connection between the first user terminal and at least one second user terminal through a wireless network, when the connection between the first user terminal and the display apparatus is established.

The method may further include transmitting or receiving a predetermined content between the first user terminal and the second user terminal, when the connection between the first user terminal and the second user terminal is made.

The method may further include controlling the state adjusting device such that the state of the peripheral device is adjusted to a preset ending state, when the connection between the first user terminal and the display apparatus is terminated.

According to another embodiment of the present invention, a display system is provided, which includes a peripheral device for adjusting an environment peripheral to a displayed image; a state adjusting device which adjusts a state of the peripheral device; an image processing device for providing an image signal; and a display apparatus for controlling the corresponding state adjusting device such that the state of the peripheral device is adjusted to a preset initial state, when a connection with the image processing device is established, and displays an image based on the image signal provided by the image processing device.

According to another embodiment of the present invention, a display apparatus is provided, which includes a communication unit for performing communications with an image providing device and a state adjusting device, the image providing device providing an image signal and the state adjusting device adjusting a state of a peripheral device for adjusting an environment peripheral to the display apparatus; a signal processor for processing the image signal provided from the image providing device; a display unit for displaying an image based on the image signal processed by the signal processor; and a controller for controlling\s the state adjusting device such that the state of the peripheral device is adjusted to a preset initial state, upon establishing a connection between the image providing device and the communication unit.

The apparatus may further include a storage for storing setting information related to the state of the peripheral device, and the controller may transmit the setting information stored in the storage to the state adjusting device.

According to another embodiment of the present invention, a method for controlling a display apparatus is provided, the method including determining whether a connection between an image providing device which provides an image signal and the display apparatus has been established; controlling a state adjusting device such that a state of a peripheral device for adjusting an environment peripheral to the display apparatus is adjusted to a preset initial state, when the connection between the image providing device and the display apparatus is established; and displaying an image on the display apparatus based on the image signal provided from the image providing unit.

The method may further include transmitting setting information related to the state of the peripheral device from the display apparatus to the state adjusting device.

The method may further include determining whether the connection between the image providing device and the display apparatus has been terminated; and controlling the state adjusting device such that the state of the peripheral device is adjusted to a preset ending state, upon determining that the connection between the image providing device and the display apparatus has been terminated.

The method may further include receiving a control request of the state adjusting device from the image providing device, and controlling the state adjusting device may include controlling the state adjusting device to adjust the state of the peripheral device according to the control request.

According to another embodiment of the present invention, a user terminal is provided, which includes a storage for storing image data; a communication unit for communicating with a display apparatus and a state adjusting device, the display apparatus displaying an image based on the image data and the state adjusting device adjusting a state of a peripheral device for adjusting an environment peripheral to the display apparatus; and a controller for controlling the state adjusting device such that the state of the peripheral device is adjusted to a preset initial state, upon establishing a connection between the display apparatus and the communication unit, and for transmitting the image data to the display apparatus.

According to another embodiment of the present invention, a method for controlling a user terminal is provided, the method including determining whether a connection has been established between the user terminal and a display apparatus that displays an image based on image data; controlling a state adjusting device such that a state of a peripheral device for adjusting an environment peripheral to the display apparatus is adjusted to a preset initial state, when the connection between the user terminal and the display apparatus is established; and transmitting the image data to the display apparatus.

The method may further include transmitting setting information related to the state of the peripheral device from the user terminal to the state adjusting device.

The method may further include determining whether the connection between the user terminal and the display apparatus has been terminated; and controlling the state adjusting device such that the state of the peripheral device is adjusted to a preset ending state, when the connection between the user terminal and the display apparatus is ended.

The method may further include establishing a connection between the user terminal and at least one different user terminal, when the connection between the user terminal and the display apparatus is established.

The method may further include transmitting or receiving a predetermined content between the user terminal and the different user terminal, when the connection with the different user terminal is made.

The method may further include receiving a control request of the state adjusting device from the display apparatus, wherein the controlling comprises controlling the state adjusting device to adjust the state of the peripheral device according to the control request.

BRIEF DESCRIPTION OF THE DRAWINGS

The above and/or other aspects will become apparent and more readily appreciated from the following description of the embodiments, taken in conjunction with the accompanying drawings, in which.

DETAILED DESCRIPTION OF EMBODIMENTS OF THE PRESENT INVENTION

Embodiments of the present invention are described herein in detail with reference to accompanying drawings so as to be easily realized by a person having ordinary knowledge in the art. The embodiments may be embodied in various forms without being limited to the embodiments set forth herein. Descriptions of well-known parts are omitted for clarity, and like reference numerals refer to like elements throughout.

Figure 1:
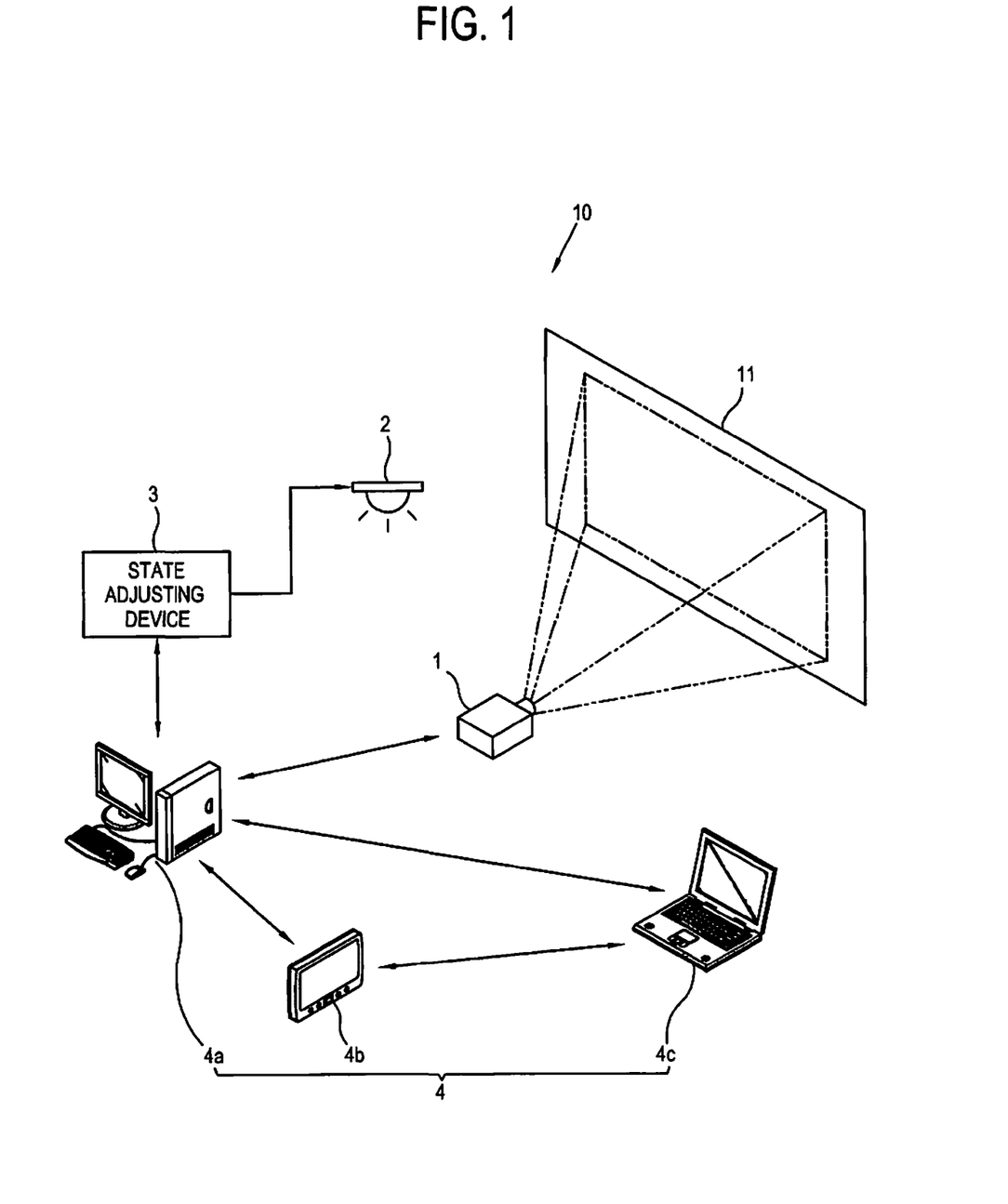
FIG. 1 illustrates a structure of a display system in accordance with an embodiment of the present invention.

FIG. 1 illustrates a structure of a display system 10 in accordance with an embodiment of the present invention. The display system 10 of FIG. 1 may be equipped in any of various spaces including a meeting room of a company, a school, a public institution, etc. The display system 10 of FIG. 1 may include a display apparatus 1 for displaying an image based on an image signal. The display apparatus 1 may be embodied any of various types of display devices including a projector, an electronic blackboard, a TeleVision, etc. and display an image 11 such that various participants in the meeting may simultaneously watch the displayed image 11.

The display apparatus 1 may receive an image signal from an external source. The display system 10 may further include a first user terminal 4a (hereinafter referred to as an "image-providing device" or a "user terminal") that provides an image signal to the display apparatus 1. The first user terminal 4a may be embodied as a device such as a computer system such as a desktop PC, a laptop PC, a smart phone, etc.

According to embodiments of the present invention, the display system 10 may provide an adaptive meeting environment to participants in the meeting. The display system 10, may further include a peripheral device 2 for controlling a meeting environment of the display system 10. The peripheral device of the present embodiment may include a lighting device 2a (referring to FIG. 4) such as an electric lamp for lighting a space in the meeting room.

The peripheral device 2 may adjust its state to adaptively control the meeting environment under the control according to external controls. For example, the brightness of a light emitted from the lighting device 2a may be adjusted. Herein, the display system 10 may further include a state adjusting device 3 capable of adjusting the state of the peripheral device 2. The state adjusting device 3 may be adaptively provided depending on the characteristic of the target peripheral device 2. For example, to adjust the state of the lighting device 2a, the state adjusting device 3 may include a unit for performing a dimming process capable of adjusting a light emitting level of the lighting device 2a. The state adjusting device 3 may further include an interface unit (not shown) for receiving state information from the peripheral device 2 and transmitting a state adjusting command to the peripheral device 2.

The display system 10 may control the state adjusting device 3 to automatically adaptively change the state of the peripheral device 2 according to a meeting environment. The first user terminal 4a may control the state adjusting device 3. Specifically, when the first user terminal 4a is initially connected to the display apparatus 1, the first user terminal 4a may control the state adjusting device 3 to adjust according to an initial environment. The first user terminal 4a and the state adjusting device 3 may communicate according to various communication types in accordance with embodiments of the present invention. Such various communication types include wireless Local Area Networking (LAN), communications compliant with BLUETOOTH® or ZIGBEE® communication protocols, etc.

According to the present example, it is assumed when users arrive into an empty meeting room to conduct a meeting. In this case, the lighting device 2a such as an electric lamp may have been turned off, and the first user terminal 4a may not be connected to the display apparatus 1. To start the meeting, once the display apparatus 1 is connected to the first user terminal 4a, the first user terminal 4a may transmit, to the state adjusting device 3, information for reporting that the connection with the display apparatus 1 is completed (hereinafter, simply referred to as "connection completion information"). Once receiving the connection completion information from the first user terminal 4a, the state adjusting device 3 may control the lighting device 2a to enter a corresponding preset initial state. The preset state of the lighting device 2a in accordance with the present embodiment may be a state for lighting a target space at a desired level, for example. Further, the state of the lighting device 2a may be adjusted according to properties of the display apparatus 1. For example, an initial brightness level of the lighting device 2a may be determined according to a type of the display apparatus 1 (i.e., whether the display apparatus 1 is an electronic blackboard, a projector, etc.).

As such, the display system 10 may provide a more convenient and appropriate meeting environment by sensing whether a connection between the first user terminal 4a and the display apparatus 1 is completed, recognizing an initial meeting environment, and automatically adaptively adjusting the state of the peripheral device 2 according to the recognized initial meeting environment.

Figure 2:
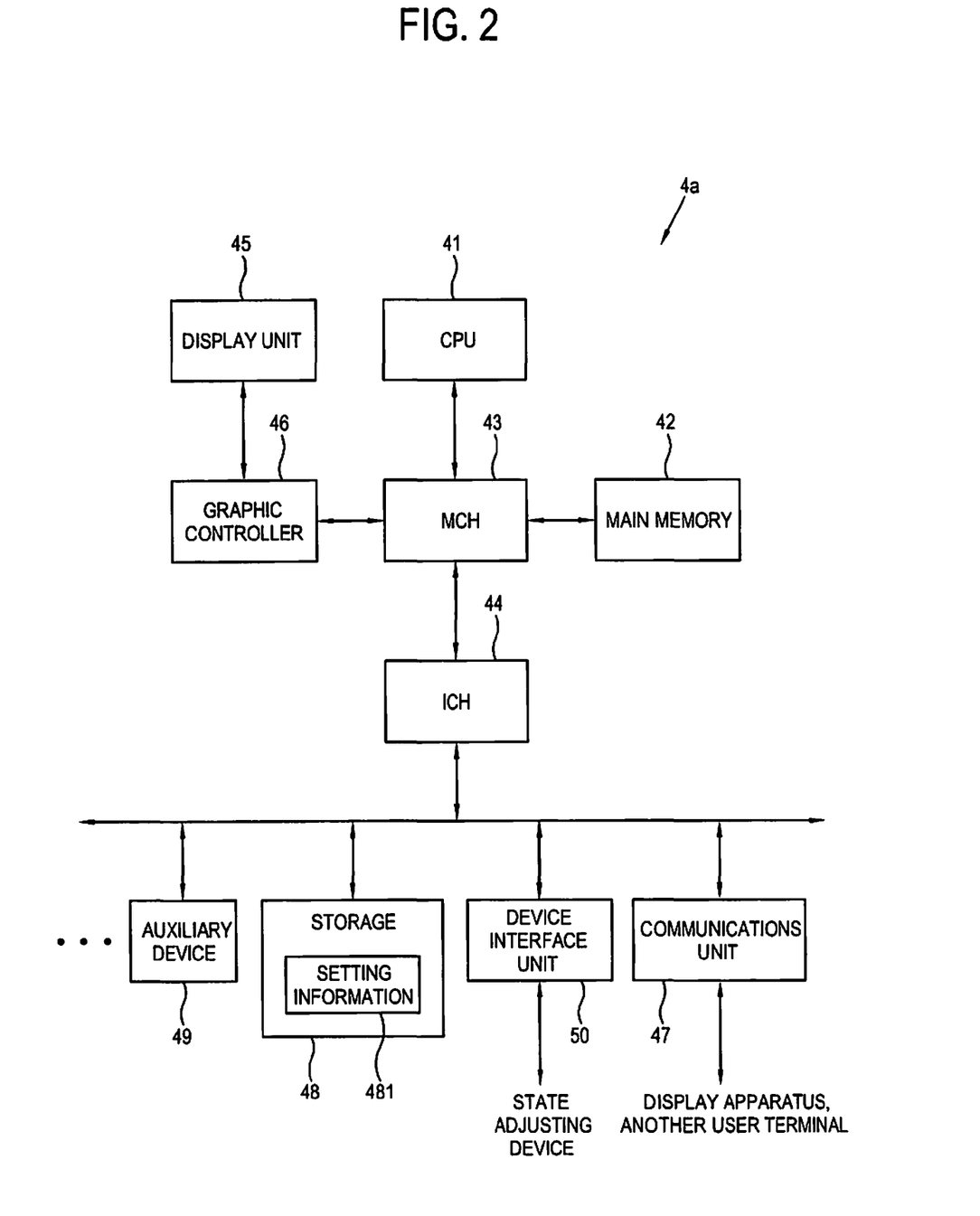
FIG. 2 is a block diagram illustrating a first user terminal shown in FIG. 1.

Hereinafter, the first user terminal 4a will be described in more detail with reference to FIG. 2. FIG. 2 is a block diagram showing the first user terminal 4a shown in FIG. 1.

The first user terminal 4a, as shown in FIG. 2, may include a Central Processing Unit (CPU) 41, a main memory 42, a Memory Controller Hub (MCH) 43, an Input/Output (I/O) Controller Hub (ICH) 44, a display unit 45, a graphic controller 46, a communication unit 47, a storage 48 and an auxiliary device 49.

The CPU 41, which controls the general operation of the first user terminal 4a, may execute a computer program loaded in the main memory 42. The main memory 42 may include a computer program to be executed by the CPU 41 and temporarily store data related to the operation performance of the CPU 41. Computer programs according to embodiments of the present invention may include a Basic Input Output System (BIOS), an operating system, and/or an application. The BIOS of the present embodiment may be stored in a non-volatile memory, i.e., a BIOS Read Only Memory (ROM), and the operating system and the application may be stored in a storage 48, e.g., a hard disk drive. The main memory 42, which is a volatile memory, may be embodied as a Double-Data-Rate Synchronous Dynamic Random Access Memory (DDR SDRAM), etc.

The graphic controller 46 may process graphic data, and the display unit 45 may display an image based on graphic data processed by the graphic controller 46. The display unit 45 may be embodied as a Liquid Crystal Display (LCD), Organic Light Emitting Diodes (OLED), etc.

The storage 48, which is a non-volatile memory capable storing data, may be embodied as a hard disk drive, a Compact Disc (CD)-ROM, a Digital Versatile Disc (DVD)-ROM, etc. When the state of the peripheral device 2 is adjusted, the storage 48 may store setting information 481 related to the state of the peripheral device 2 as reference information. As described above, the setting information 481 is information related to the initial state of the peripheral device 2 when the first user terminal 4a is connected to the display apparatus 1. According to the present embodiment of the present invention, when the first user terminal 4a is connected to the display apparatus 1, the first user terminal 4a may transmit, to the state adjusting device 3, the connection completion information and stored setting information 481. The state adjusting device 3 may adjust the initial state of the peripheral device 2 based on the setting information 481 transmitted from the first user terminal 4a. According to another embodiment of the present invention, the setting information related to the initial state of the peripheral device 2 may be provided in another device, e.g., the state adjusting device 3 itself, instead of the first user terminal 4a. In the present example, upon receiving the connection completion information from the first user terminal 4a, the state adjusting device 3 may adjust the initial state of the peripheral device 2 based on the stored setting information.

The auxiliary device 49 may include a mouse, a keyboard, a Universal Serial Bus (USB) drive, a sound card, a speaker, a microphone, etc.

The MCH 43 may interface reading and writing between a unit such as the CPU 41, etc. and the main memory 42. The ICH 44 may interface the communications between the CPU 41 and the auxiliary device 49.

The communication unit 47 performs communications with the display apparatus 1 under a control of a computer program executed by the CPU 41 (hereinafter, referred to as "control program"). In accordance with the present embodiment of the invention, the type of communications between the communication unit 47 and the display apparatus 1 may include a wireless LAN and a local wireless communications. According to another embodiment of the present invention, the communication unit 47 may perform wired communications with the display apparatus 1. When wireless communications are performed between the communication unit 47 and the display apparatus 1, an image signal of a target image to be displayed may be transmitted to the display apparatus 1 through the communication unit 47.

The control program of the first user terminal 4a may monitor whether an initial connection between the communication unit 47 and the display apparatus 1 is made and control the state adjusting device 3 depending on the monitored result.

Figure 3:
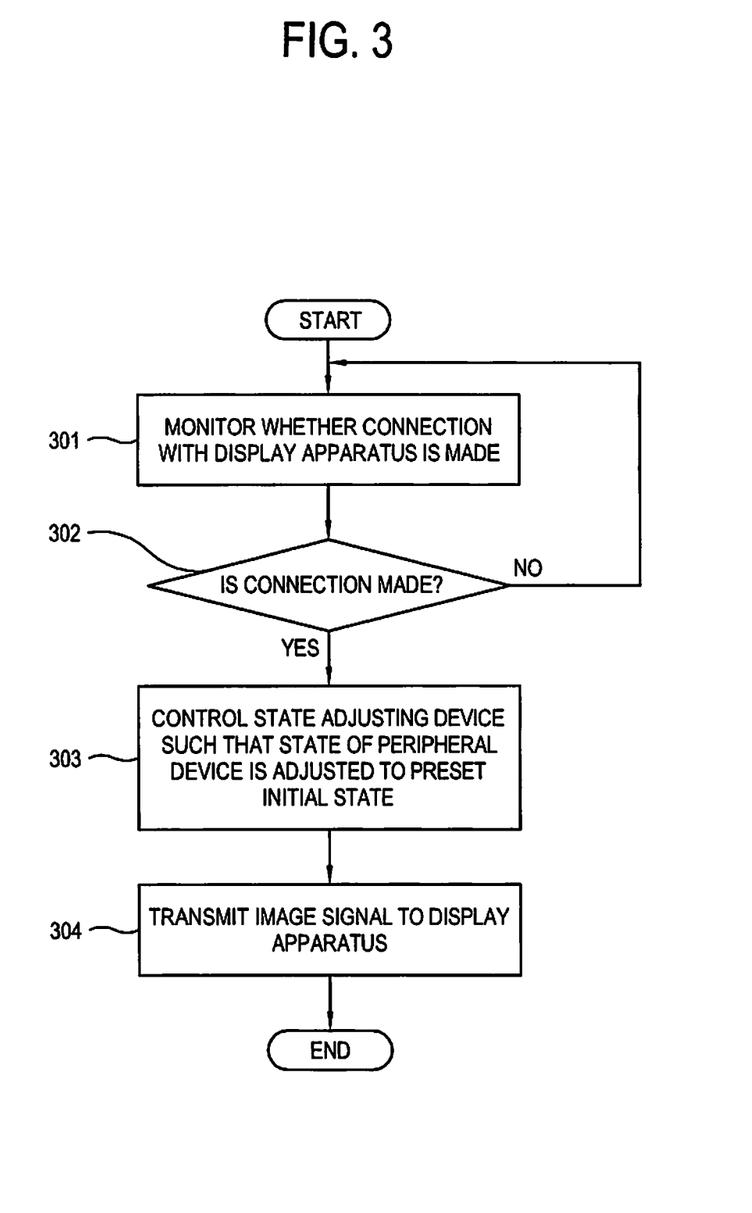
FIG. 3 is a flowchart illustrating an example of an operation of the first user terminal shown in FIG. 2.

FIG. 3 is a flowchart illustrating an operation of the control program of the first user terminal 4a in accordance with an embodiment of the present invention.

Referring to FIG. 3, after an attempt to connect the communication unit 47 to the display apparatus 1 is performed, the control program of the first user terminal 4a may monitor whether the connection between the communication unit 47 and the display apparatus 1 is successfully completed, in step 301. Upon determining that a connection between the communication unit 47 and the display apparatus 1 has not been successfully completed, in step 302, operation returns to step 301.

However, upon a determination that a connection between the communication unit 47 and the display apparatus 1 is successfully completed in step 302, the control program of the first user terminal 4a may control the state adjusting device 3 such that the state of the peripheral device 2 is adjusted to a preset initial level, in step 303. For example, when the initial connection between the communication unit 47 and the display apparatus 1 is completed, the first user terminal 4a may transmit connection completion information to the state adjusting device 3. Upon receiving the connection completion information from the first user terminal 4a, the state adjusting device 3 may adjust the state of the peripheral device 2 to a preset initial level. Accordingly, the state of the peripheral device 2 may be adaptively adjusted to the meeting environment. Meanwhile, in step 303, the control program of the first user terminal 4a may refer to the setting information 481 stored in the storage 48 to check the preset initial state. For example, the first user terminal 4a may transmit the connection completion information and the stored setting information 481 to the state adjusting device 3. The state adjusting device 3 may adjust the state of the peripheral device 2 based on the setting information 481 transmitted from the first user terminal 4a. According to another embodiment of the present invention, the setting information related to the initial state of the peripheral device 2 may be stored in the state adjusting device 3 itself. In this case, upon receiving the connection completion information from the first user terminal 4a, the state adjusting device 3 may adjust the state of the peripheral device 3 according to the stored setting information.

After a connection between the communication unit 47 and the display apparatus 1 is successfully established, the control program of the first user terminal 4a may transmit an image signal to the display apparatus 1 through the communication unit 47, in step 304. Accordingly, the display apparatus 1 may display an image based on the transmitted image signal. In step 304, the control program of the first user terminal 4a may allow the image signal transmitted to the display apparatus 1 to have a preset resolution.

According to another embodiment of the present invention, when transmitting an image signal through a wired connection, the connection between the first user terminal 4a and the display apparatus 1 may be made through a corresponding signal transmitting line. The signal transmitting line is connected to a signal output port provided in the graphic controller 46. In this case, the control program of the first user terminal 4a may monitor whether a signal transmitting line of the display apparatus 1 is connected to the signal output port provided in the graphic controller 46 and control the state adjusting device 3 according to the monitored result.

As described above, the states of various peripheral devices 2 may be adjusted in accordance with embodiments of the present invention.

Figure 4:
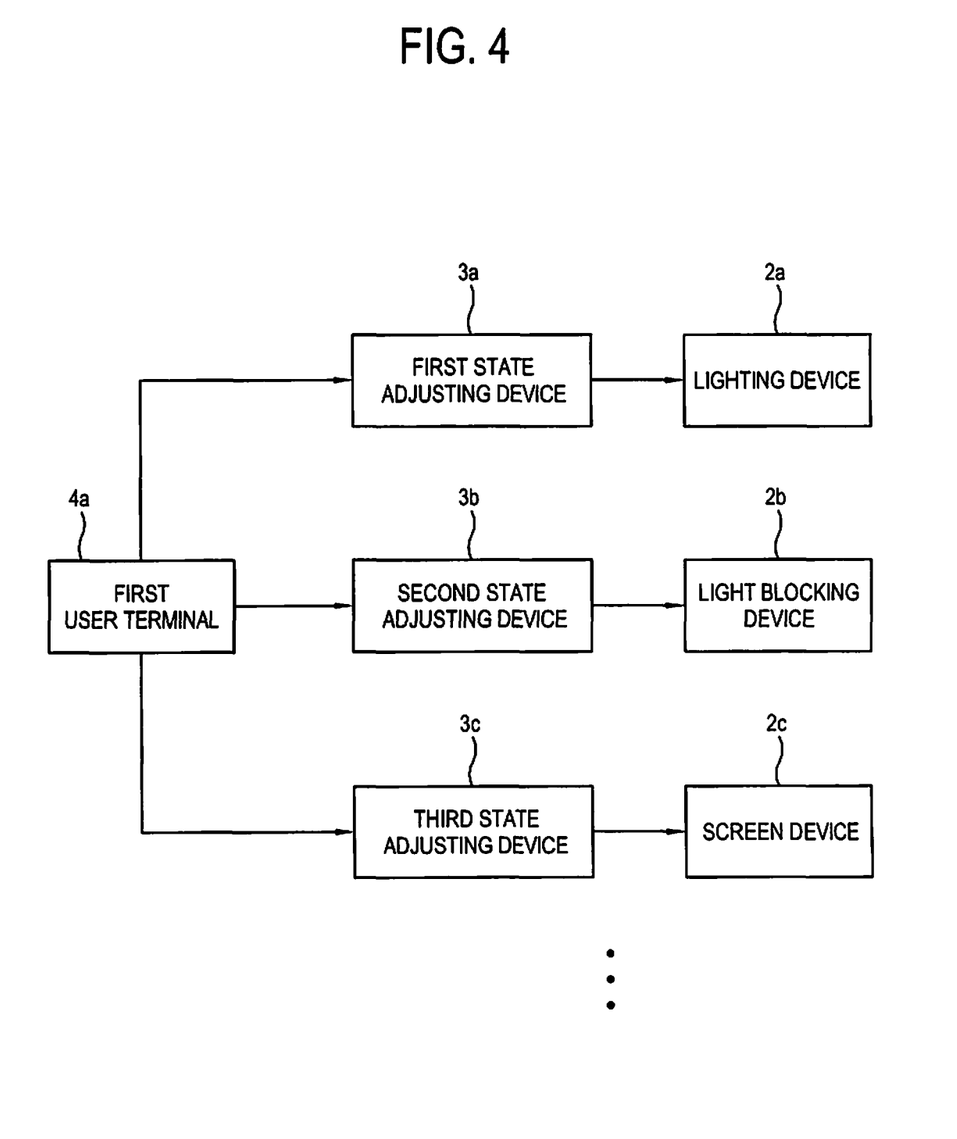
FIG. 4 is a block diagram illustrating various peripheral devices in accordance with an embodiment of the present invention.

FIG. 4 is a block diagram illustrating various peripheral devices 2 in accordance with an embodiment of the present invention. As shown in FIG. 4, the peripheral device 2 may include a light blocking device 2b such as a curtain, etc., a screen device 2c on which an image projected from the display apparatus 1 such as a projector is displayed, and other similar devices, as well as the aforementioned lighting device 2a. Similar to the state of the lighting device 2a, the states of the light blocking device 2b, the screen device 2c and other similar devices may be adjusted according to the meeting environment. For example, the light blocking device 2b (e.g., a curtain) that has been closed in an initial state may be opened to a predetermined level. As another example, the screen device 2c may lower a screen that has been raised up in an initial state such that an image is appropriately displayed on the screen after the screen is lowered.

The state adjusting device 3 may be provided as a single device for controlling all of the lighting device 2a, the light blocking device 26, the screen device 2c, etc. According to another embodiment of the present invention, as shown in FIG. 4, the state adjusting device 3 may include a plurality of state adjusting devices 3a to 3c that respectively correspond to each of the peripheral devices 2a to 2c. When using the plural state adjusting devices 3a to 3c, the first user terminal 4a may control the respective state adjusting devices 3a to 3c according to whether the connection with the display apparatus 1 is made such that the state of each of the peripheral devices 2a to 2c is adjusted to a preset initial state.

The first user terminal 4a of the present embodiment may control the state adjusting devices 3a to 3c through the communications therewith by the communication unit 47. Alternatively, according to another embodiment of the present invention, the first user terminal 4a may further include a device interface unit 50 having dedicated interface functions respectively corresponding to the state adjusting devices 3a to 3c to perform the interface therewith and control the state adjusting devices 3a to 3c through the device interface unit 50. According to this alternative embodiment, when the initial connection between the first user terminal 4a and the display apparatus 1 is made, the first user terminal 4a may transmit connection completion information to the device interface unit 50 instead of the communication unit 47.

According to still another embodiment, the display apparatus 1 may start driving a unit for outputting an image upon connecting with the first user terminal 4a.

Figure 5:
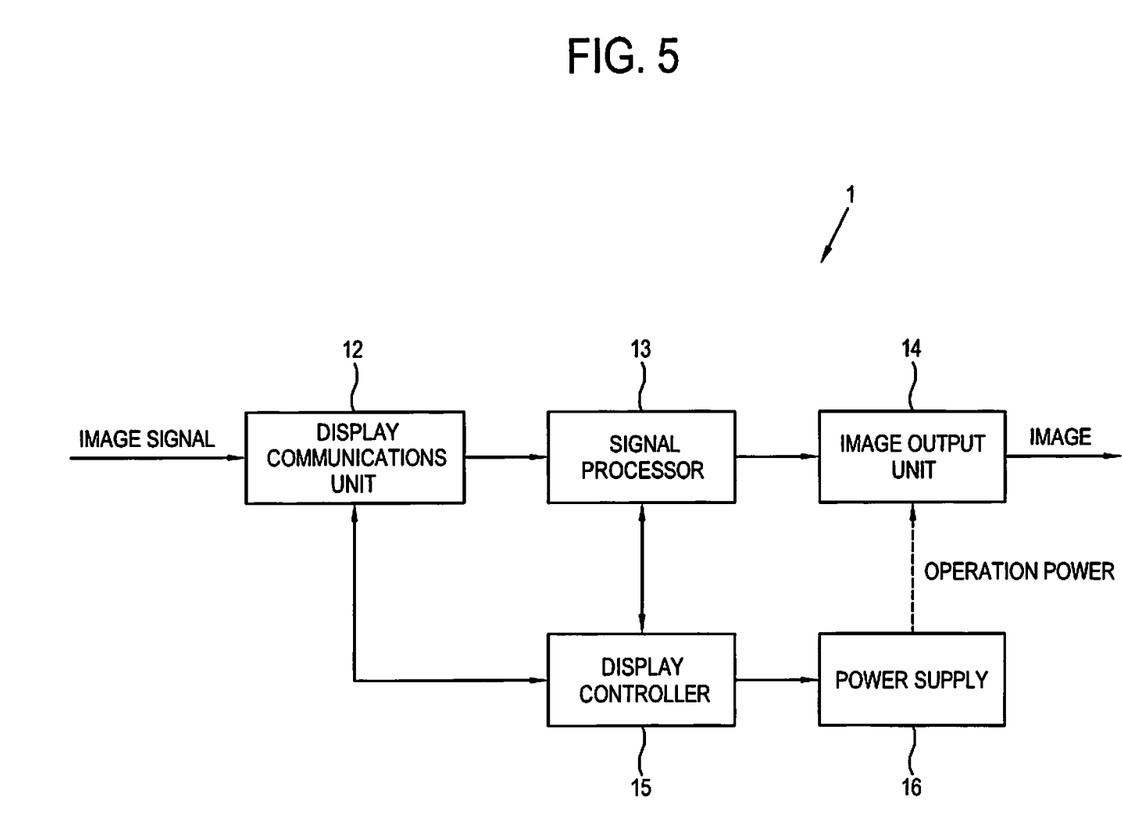
FIG. 5 illustrates a structure of a display apparatus in accordance with an embodiment of the present invention.

FIG. 5 illustrates a structure of the display apparatus 1 in accordance with an embodiment of the present invention. According to the embodiment described with reference to FIG. 5, the display apparatus 1 of the present embodiment may be a projector, for example. As shown in FIG. 5, the display apparatus 1 may include a display communication unit 12 for receiving an image signal by performing communications with the first user terminal 4a, a signal processor 13 for processing an image signal received through the display communication unit 12, a image output unit 14 for outputting an image based on the image signal processed by the signal processor 13, a power supply 16 for supplying an operation power to the image output unit 14, and a display controller 15 for generally controlling the above units.

The image output unit 14 of the display apparatus 1 in accordance with the embodiment described with reference to FIG. 5 may include a light source (not shown) for generating and supplying a light to project an image on a screen and an optic mechanism (not shown) for projecting the light supplied from the light source to correspond to the image. The power supply 16 may supply the operation power to devices such as the light source of the image output unit 14, for example. Before the display apparatus 1 is connected to the first user terminal 4a, no power is supplied to devices such as the light source of the image output unit 14. The display controller 15 may control the driving of the image output unit 14 according to whether the connection with the first user terminal 4*a* is established.

Figure 6:
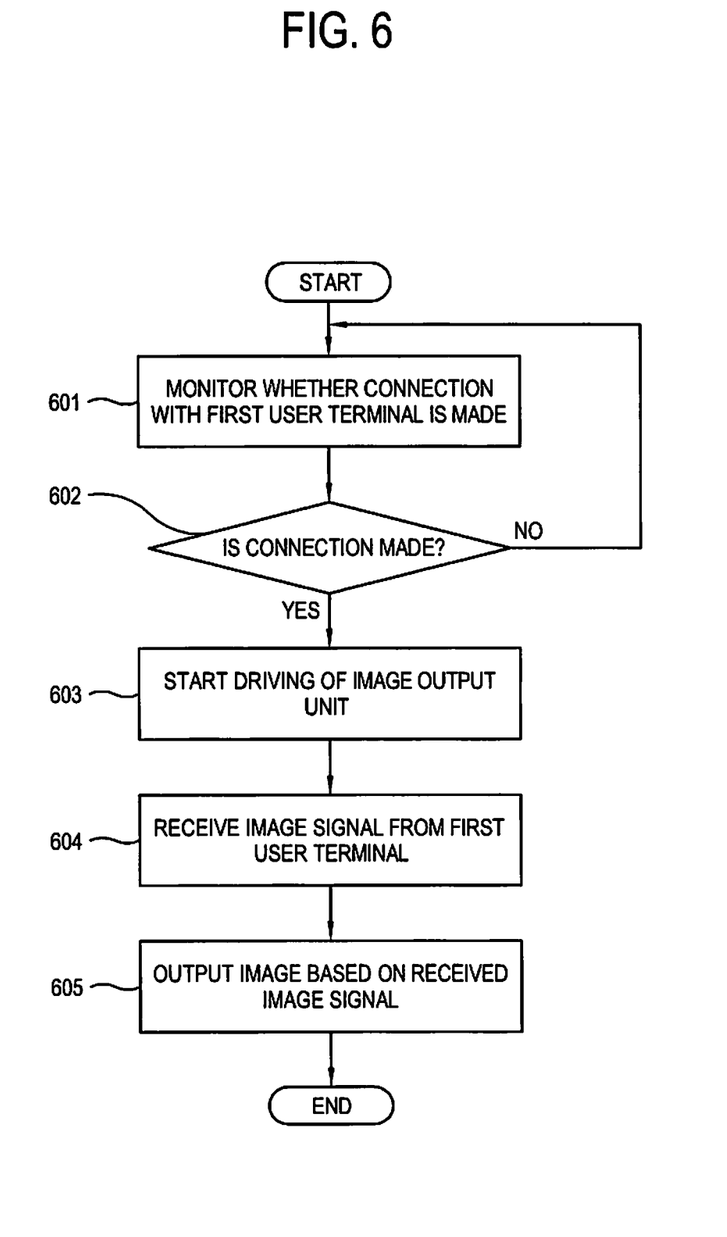
FIG. 6 is a flowchart illustrating an operation of the display apparatus shown in FIG. 5.

FIG. 6 is a flowchart illustrating an operation of the display apparatus 15 in accordance with an embodiment of the present invention.

Referring to FIG. 6, the display controller 15 may first attempt to connect the display communication unit 12 to the first user terminal 4*a* and monitor whether the connection between the display communication unit 12 and the first user terminal 4*a* is successfully completed, in step 601. If, as the result of step 601, it is determined that the connection between the display communication unit 12 and the first user terminal 4*a* has not been successfully completed, in step 602, method returns to step 601.

However, if it is determined that the connection between the display communication unit 12 and the first user terminal 4*a* is successfully completed, in step 602, the display controller 15 may control the image output unit 14 to start operating at an initial state. In operation 603, the display controller 15 may control the power supply 16 to start a supply of operation power to the light source of the image output unit 14, for example. Accordingly, it is possible to allow the display apparatus 1 to be operated more adaptively according to the meeting environment, thereby reducing power consumption and improving user convenience.

After the connection between the display communication unit 12 and the first user terminal 4*a* is made, the display controller 15 may receive an image signal from the first user terminal 4*a* through the display communication unit 12, in step 604. The display controller 15 may control the signal processor 13 such that an image is output based on the transmitted image signal by the image output unit 14, in step 605.

According to another embodiment of the present invention, the control of the state adjusting device 3 may be performed by the display apparatus 1. In the present example, the display apparatus 1 may include the above-mentioned units required for the control of the state adjusting device 3. A detailed description related to the units is omitted for clarity and conciseness. The first user terminal 4*a* may check whether the display apparatus 1 is connected to the first user terminal 4*a*. If the display apparatus 1 is connected to the first user terminal 4*a*, a signal for requesting the control of the state adjusting device 3 is transmitted to the display apparatus 1, such that the state of the peripheral device 2 is adjusted to a preset initial state. Hereinafter, this signal is referred to as a "control request signal". Upon receiving the control request signal from the first user terminal 4*a*, the display apparatus 1 may control the state adjusting device 3 according to the received control request signal such that the state of the peripheral device 2 is adjusted to a preset initial state.

Hereinafter, a display system 10 according to an embodiment of the present invention is further described. According to embodiments of the present invention, it is possible to provide an adaptive communication environment according to a meeting environment between a plurality of user terminals 4 of participants in a meeting.

Figure 7:
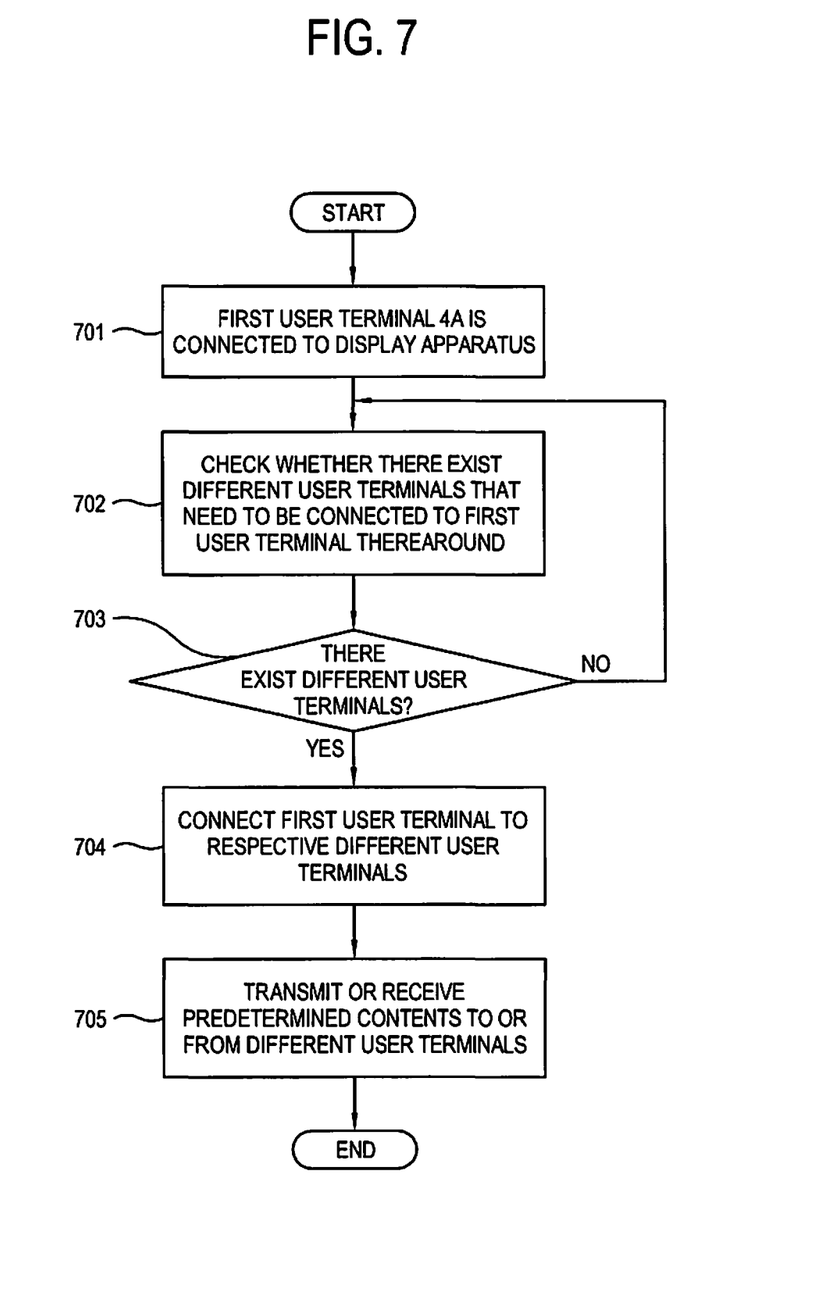
FIG. 7 is a flowchart illustrating another example of an operation of the first user terminal shown in FIG. 2.

FIG. 7 is a flowchart illustrating an operation of a control program of the first user terminal 4*a* in accordance with an embodiment of the present invention. Referring to FIG. 7, once the first user terminal 4*a* is connected to the display apparatus 1, in step 701, the control program of the first user terminal 4*a* may determine whether there are different user terminals (i.e., user terminals 4*b* and 4*c*) that need to be connected to the first user terminal 4*a*, in step 702. The different user terminals 4*b* and 4*c* may be embodied as one of various type terminals such as mobile phones, PDAs, PCs, the same type of terminal as the first user terminal 4*a*, etc.

If, as the result of step 702, it is determined that there are not any different user terminals that need to be connected to the first user terminal 4*a*, in step 703, the method returns to step 702, or the method may terminate (not shown).

However, as the result of step 702, when it is determined that different user terminals that need to be connected to the first user terminal 4*a* (in the present example, user terminals 4*b* and 4*c*) exist, in step 703, the control program of the first user terminal 4*a* may start to perform the connection with the different user terminals 4*b* and 4*c* that need to be connected thereto, in step 704. The connection between the first user terminal 4*a* and the different user terminals 4*b* and 4*c* may be made by using a local wireless communications method such as the wireless LAN. Accordingly, it is possible to improve the user convenience more and more by automatically adaptively control the communications environment of the plural user terminals 4 that are given to the participants in the meeting.

Next, the control program of the first user terminal 4*a* may control the communication unit 47 such that the first user terminal 4*a* transmits or receives predetermined contents to or from the respective different user terminals 4*b* and 4*c* that are connected thereto. The predetermined contents may include contents such as reference data files or other similar data for the meeting. Target contents to be transmitted or received may be determined by referring to the setting information 481 stored in the storage 48. Accordingly, it is possible to more adaptively provide the meeting environment, thereby improving the user convenience.

Hereinafter, the display system 10 according to embodiment s of the present invention is further described. According to the present example, when a meeting is finished, it is possible to provide an adaptive meeting environment suited to the finished meeting.

Figure 8:
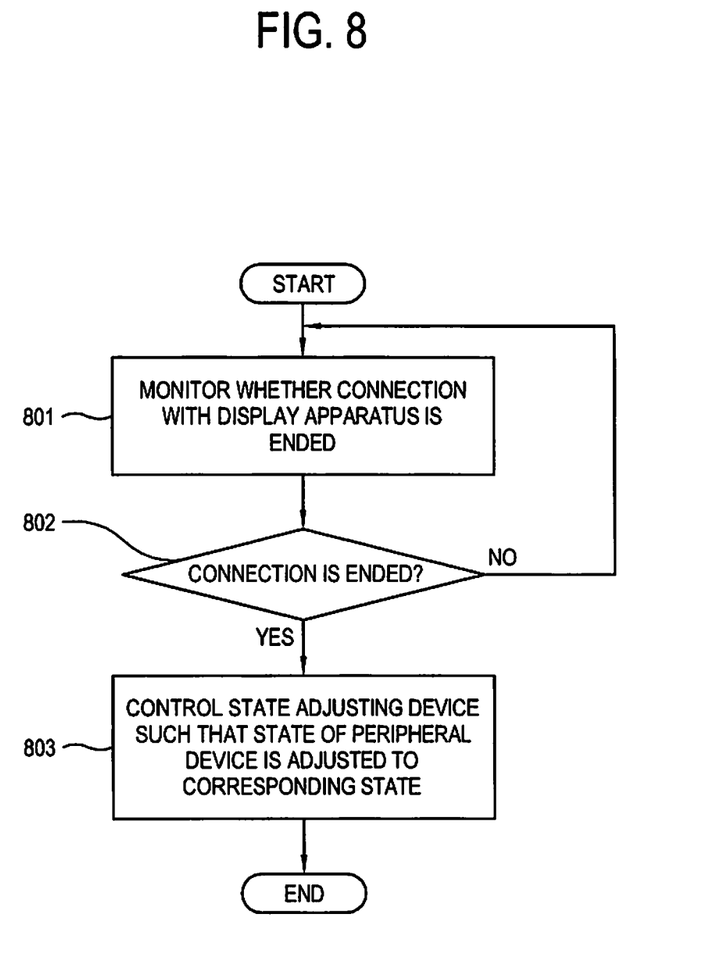
FIG. 8 is a flowchart illustrating still another example of an operation of the first user terminal shown in FIG. 2.

FIG. 8 is a flowchart illustrating an operation of the control program of the first user terminal 4 according to an embodiment of the present invention. According embodiment described with reference to FIG. 8, it is assumed that the first user terminal 4*a* has been connected to the display apparatus 1, and the peripheral devices 2 have been under the state where the meeting has been carried on. For example, the electric lamp has been turned on.

Referring to FIG. 8, the control program of the first user terminal 4*a* may first monitor whether the connection with the display apparatus 1 has ended, in step 801. In step 801, the termination of the connection between the first user terminal 4*a* and the display apparatus 1 may include terminating the communication connection with the display apparatus 1 by cutting off power to the first user terminal 8*a* according to a user's request. As the result of step 801, when it is determined that the connection with the display apparatus 1 has not yet ended, in step 802, the method may return to step 801.

However, as the result of step 801, if it is determined that the connection with the display apparatus 1 has ended, in step 802, the control program of the first user terminal 4*a* may control a corresponding state adjusting device 3 such that the state of the peripheral device 2 is adjusted to a preset ending state, in step 803. For example, when the connection with the display apparatus 1 is ended, the first user terminal 4*a* may transmit to the state adjusting device 3 information reporting that the connection with the display apparatus 1 has been ended. Hereinafter, this transmitted information is referred to as "connection ending information". Upon receiving the connection ending information from the first user terminal 4*a*, the state adjusting device 3 may adjust the state of the peripheral device 2 according to a preset ending state.

While adjusting to the ending state, the lighting device 2a such as an electric lamp may be turned off, and the light blocking device 2b such as a curtain may be closed. Moreover, the screen device 2c may be raised. As a result, the states of the peripheral devices 2 may be adjusted adaptively to the meeting environment. In the meantime, in step 803, the control program of the first user terminal 4a may refer to the setting information 481 stored in the storage 48 to check the preset ending state. The setting information 481 may include information related to the ending state of the peripheral device 2. For example, when the connection with the display apparatus 1 is ended, the first user terminal 4a may transmit the connection ending information and the stored setting information 481 to the state adjusting device 3. The state adjusting device 3 may adjust the state of the peripheral device 2 to the ending state based on the setting information 481 received from the first terminal user terminal 4a. According to another embodiment of the present invention, the setting information related to the ending state of the peripheral device 2 may be stored in the state adjusting device 3 itself. In this case, once receiving the connection ending information from the first user terminal 4a, the state adjusting device 3 may adjust the state of the peripheral device 2 based on the stored setting information.

Although an example in which the control of the state adjusting device 3 may be performed by the first user terminal 4a that transmits an image signal is described above, the display system according to embodiments of the present invention is not limited thereto. For example, the display system may further include a control device (not shown) for controlling the state adjusting device 3 regardless of the first user terminal 4a. The control device may sense whether the first user terminal 4a for transmitting an image signal is connected to or disconnected from the display apparatus 1 and control the state adjusting device 3 such that the state of the peripheral device 2 is adjusted to a corresponding state according to the sensed result.

Figure 9:
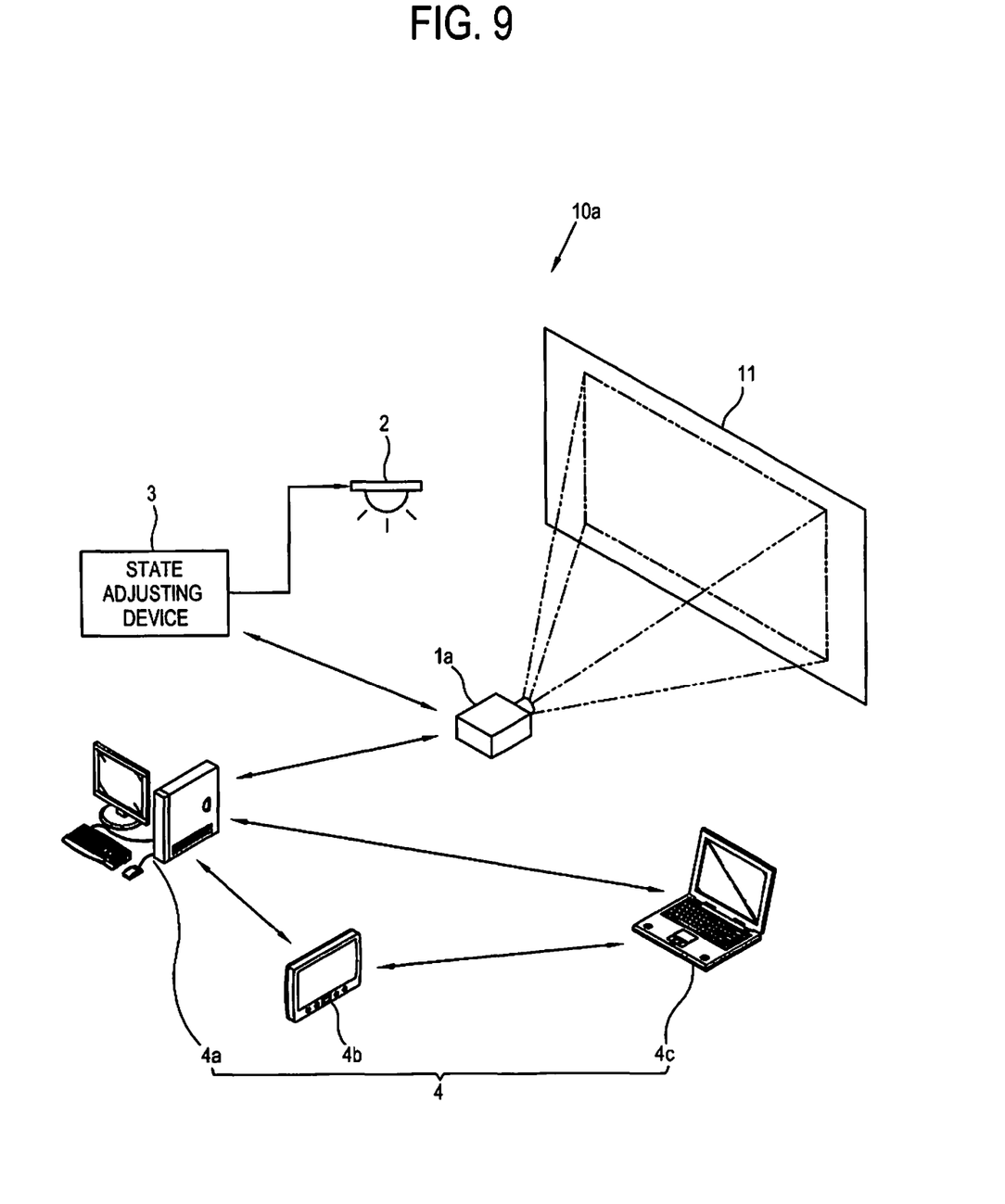
FIG. 9 illustrates a structure of a display system in accordance with another embodiment of the present invention.

FIG. 9 illustrates a structure of a display system 10a in accordance with another embodiment of the present invention. In the display system 10a of FIG. 9, a display apparatus 1a controls the state adjusting device 3. To control the state adjusting device 3, the display apparatus 1a may have the configuration as described with reference to FIG. 1. and the display apparatus 1a may further have a configuration for controlling the state adjusting device 3 that is similar to the configuration of the first user terminal 4a.

When being connected or disconnected to or from the first user terminal 4a, the display apparatus 1a may control the state adjusting device 3 such that the state of the peripheral device 2 is adjusted to a corresponding state. Specifically, the display apparatus 1a may monitor whether a connection with the first user terminal 4a is established. When the display apparatus 1a is connected to the first user terminal 4a, the display apparatus 1a may transmit, to the state adjusting device 3, connection completion information for reporting that the connection with the first user terminal 4a is established. Upon receiving the connection completion information from the display apparatus 1a, the state adjusting device 3 may adjust the state of the peripheral device 2 according to a preset initial state. Setting information related to the preset initial state may be stored in the display apparatus 1a and transmitted from the display apparatus 1a to the state adjusting device 3. Alternatively, the setting information may be stored in the state adjusting device 3 itself.

Meanwhile, the display apparatus 1a may monitor whether a connection with the first user terminal 4a is established. When a connection with the first user terminal 4a ends, the display apparatus 1a transmits, to the state adjusting device 3, connection ending information reporting that the connection with the first user terminal 4a terminated. Upon receiving the connection ending information from the display apparatus 1a, the state adjusting device 3 may adjust the state of the peripheral device 2 according to a preset ending state. Setting information related to the preset ending state may be also stored in the display apparatus 1a or the state adjusting device 3.

Regarding embodiments of the present invention described with reference to FIG. 9, a description of functions and operations identical or similar to operations or functions related to the control of the state adjusting device 3 to be performed by the display apparatus 1a to the above descriptions related to the control of the state adjusting device 3 to be performed by the first user terminal 4a described herein with reference to FIG. 2 are omitted for clarity and conciseness.

According to another embodiment of the present invention, the first user terminal 4a may perform the control of the state adjusting device 3. In this case, the first user terminal 4a may have the above-described configuration required for controlling the state adjusting device 3, and therefore a detailed description thereof is omitted. Specifically, the display apparatus 1a may determine whether the first user terminal 4a is connected to the display apparatus 1a. When the first user terminal 4a is connected to the display apparatus 1a, the display apparatus 1a may transmit, to the first user terminal 4a, a signal for requesting control of the state adjusting device 3 to adjust the state of the peripheral device 2 to a preset initial state (hereinafter, referred to as "control request signal). Upon receiving the control request signal from the display apparatus 1a, the first user terminal 4a may control the state adjusting device 3 according to the received control request signal such that the state of the peripheral device 2 is adjusted to the preset initial state.

Further, the display apparatus in accordance with exemplary embodiments of the present invention may be embodied as a display apparatus of a display type such as an Liquid Crystal Display (LCD), Plasma Display Panel (PDP), Organic Light Emitting Diode (OLED), etc. as well as the projector type display apparatus 1 illustrated in FIG. 5. The display apparatus of the types such as an LCD or other similar devices may be a TV including a signal receiving unit (not shown) for receiving a broadcasting signal, a signal processing unit (not shown) for processing a broadcasting signal received by the signal receiving unit, and a controller (not shown) for controlling an image to be displayed based on a broadcasting signal processed by the signal processing unit. A complete description of the configuration of the display apparatus according to embodiments of the present invention for the adaptive environmental control, which is identical to that the configuration of the display apparatus 1 described with reference to FIG. 5, will be omitted for clarity and conciseness.

A display apparatus in accordance with embodiments of the present invention may be embodied as an electronic black board. In this case, the electronic blackboard may include a pointing device (not shown) for outputting an user input signal corresponding to user motion, a sensor (not shown) for sensing an user input signal outputted by the pointing device, and a controller (not shown) for controlling an image to be displayed based on the user input signal sensed by the sensor, in addition to the configuration described with reference to FIG. 5. According to another embodiment of the present invention, the electronic blackboard may be applied to a display apparatus of various display types, such as LCD and the projector type display apparatus illustrated in FIG. 5.

Although embodiments of the present invention are illustrated and described herein, it will be appreciated by those skilled in the art that changes may be made to these embodiments without departing from the principles and spirit of the invention, the scope of which are defined by the appended claims and their equivalents.

What is claimed is:

1. A display system comprising:
    a display apparatus for displaying an image based on a received image signal;
    a peripheral device for adjusting an environment peripheral to the display apparatus;
    a state adjusting device for adjusting a state of the peripheral device; and
    a first user terminal for, when a connection with the display apparatus is established, controlling the state adjusting device such that the state of the peripheral device is adjusted to a preset state, and for transmitting the image signal to the display apparatus, and such that the state of the peripheral device is adjusted according to a type of the display apparatus,
    wherein information on the preset state is stored in the first user terminal, and
    wherein the first user terminal refers to the stored information on the preset state in response to the connection with the display apparatus being established.

2. The system of claim 1, wherein the first user terminal establishes a connection with one or more second user terminals, when the connection with the display apparatus is established.

3. The system of claim 2, wherein a connection with the one or more second user terminals is established to the first terminal, and the first user terminal transmits predetermined content to the one or more second user terminals or receives the predetermined content from the one or more second user terminals.

4. The system of claim 1, wherein the first user terminal controls the state adjusting device such that the state of the peripheral device is adjusted to a preset ending state, when the connection with the display apparatus is terminated.

5. A method for controlling a display system by using a display apparatus which displays an image based on a received image signal, the method comprising:
    determining whether a connection between a first user terminal and the display apparatus has been established;
    controlling a state adjusting device such that a state of a peripheral device for adjusting an environment peripheral to the display apparatus is adjusted to a preset state, upon determining that the connection between the first user terminal and the display apparatus has been established, and such that the state of the peripheral device is adjusted according to a type of the display apparatus; and
    transmitting the image signal from the first user terminal to the display apparatus,
    wherein information on the preset state is stored in the first user terminal, and
    wherein the first user terminal refers to the stored information on the preset state in response to the connection with the display apparatus being established.

6. The method of claim 5, wherein a connection is established between the first user terminal and one or more second user terminals through a network, when the connection between the first user terminal and the display apparatus is established.

7. The method of claim 6, further comprising, when the connection between the first user terminal and the second user terminal is established, transmitting predetermined content from the first user terminal to the one or more second user terminals or receiving, by the first user terminal, the predetermined content from one or more second user terminals.

8. The method of claim 5, further comprising controlling the state adjusting device such that the state of the peripheral device is adjusted to a preset ending state, when the connection between the first user terminal and the display apparatus is terminated.

9. A display system comprising:
    a peripheral device for adjusting an environment peripheral to a displayed image;
    a state adjusting device for adjusting a state of the peripheral device;
    an image processing device for providing an image signal; and
    a display apparatus for controlling the corresponding state adjusting device such that the state of the peripheral device is adjusted to a preset state, when a connection with the image processing device is established, and displays an image based on the image signal provided by the image processing device, and such that the state of the peripheral device is adjusted according to a type of the display apparatus,
    wherein information on the preset state is stored in the image processing device, and
    wherein the image processing device refers to the stored information on the preset state in response to the connection with the image processing device being established.

10. The system of claim 9, wherein the display apparatus controls the state adjusting device such that the state of the peripheral device is adjusted to a preset ending state, when the connection with the image processing device is terminated.

11. A display apparatus comprising:
    a communication unit for performing communications with an image providing device and a state adjusting device, the image providing device providing an image signal and the state adjusting device adjusting a state of a peripheral device for adjusting an environment peripheral to the display apparatus;
    a signal processor for processing the image signal provided from the image providing device;
    a display unit for displaying an image based on the image signal processed by the signal processor; and
    a controller for controlling the state adjusting device such that the state of the peripheral device is adjusted to a preset state, upon establishing a connection between the image providing device and the communication unit, and is adjusted according to a type of the display apparatus,
    wherein information on the preset state is stored in the image providing device, and
    wherein the image providing device refers to the stored information on the preset state in response to the connection with the image providing device being established.

12. The apparatus of claim 11, further comprising:
    a storage for storing setting information related to the state of the peripheral device,
    wherein the controller transmits the setting information stored in the storage to the state adjusting device.

13. The apparatus of claim 11, wherein the controller controls the display apparatus to start to be driven, if the connection between the image providing device and the communication unit is established.

14. The apparatus of claim 11, wherein the controller controls the state adjusting device such that the state of the peripheral device is adjusted to a preset ending state, when the connection between the image providing device and the communication unit is terminated.

15. The apparatus of claim 11, wherein the controller controls the state adjusting device to adjust the state of the peripheral device according to a control request from the image providing device.

16. A method for a display apparatus, the method comprising:
   determining whether a connection between an image providing device that provides an image signal and the display apparatus has been established;
   controlling a state adjusting device such that a state of a peripheral device for adjusting an environment peripheral to the display apparatus is adjusted to a preset state, when the connection between the image providing device and the display apparatus is established, and such that the state of the peripheral device is adjusted according to a type of the display apparatus; and
   displaying an image based on the image signal provided from the image providing unit,
   wherein information on the preset state is stored in the image providing device, and
   wherein the image providing device refers to the stored information on the preset state in response to the connection with the image providing device being established.

17. The method of claim 16, further comprising transmitting, from the display apparatus to the state adjusting device, setting information related to the state of the peripheral device.

18. The method of claim 16, further comprising determining whether the connection between the image providing device and the display apparatus has been terminated; and
   controlling the state adjusting device such that the state of the peripheral device is adjusted to a preset ending state, upon determining that the connection between the image providing device and the display apparatus has been terminated.

19. The method of claim 16, further comprising receiving, from the image providing device, a control request of the state adjusting device,
   wherein controlling the state adjusting device includes controlling the state adjusting device to adjust the state of the peripheral device according to the control request.

20. A user terminal comprising:
   a storage for storing image data and setting information related to the state of a peripheral device;
   a communication unit for communicating with a display apparatus and a state adjusting device, the display apparatus displaying an image based on the image data and the state adjusting device adjusting a state of the peripheral device for adjusting an environment peripheral to the display apparatus; and
   a controller for transmitting the setting information to the state adjusting device, for controlling the state adjusting device such that the state of the peripheral device is adjusted to a preset state, upon establishing a connection between the display apparatus and the communication unit, and such that the state of the peripheral device is adjusted according to a type of the display apparatus, and for transmitting the image data to the display apparatus,
   wherein information on the preset state is stored in the user terminal, and
   wherein the user terminal refers to the stored information on the preset state in response to the connection with the user terminal being established.

21. The user terminal of claim 20, wherein the controller controls the state adjusting device such that the state of the peripheral device is adjusted to a preset ending state, when the connection between the display apparatus and the communication unit is terminated.

22. The user terminal of claim 20, wherein the communication unit performs communications with at least one different user terminal through a network, and
   the controller controls the communication unit to establish a connection with the different user terminal, when the connection between the display apparatus and the communication unit is established.

23. The user terminal of claim 22, wherein, when the connection with the different user terminal is established, the controller transmits a predetermined content to the different user terminal or receives the predetermined content from the different user terminal.

24. The user terminal of claim 20, wherein
   the controller controls the state adjusting device to adjust the state of the peripheral device according to a control request from the display apparatus.

25. A method for a user terminal, the method comprising:
   determining whether a connection has been established between a user terminal and a display apparatus that displays an image based on image data;
   transmitting, from the user terminal to the state adjusting device, setting information related to a state of a peripheral device;
   controlling a state adjusting device such that a state of the peripheral device for adjusting an environment peripheral to the display apparatus is adjusted to a preset state, when the connection between the user terminal and the display apparatus is established, and such that the state of the peripheral device is adjusted according to a type of the display apparatus; and
   transmitting the image data to the display apparatus,
   wherein information on the preset state is stored in the user terminal, and
   wherein the user terminal refers to the stored information on the preset state in response to the connection with the user terminal being established.

26. The method of claim 25, further comprising
   determining whether the connection between the user terminal and the display apparatus has been terminated; and
   controlling the state adjusting device such that the state of the peripheral device is adjusted to a preset ending state, when the connection between the user terminal and the display apparatus has been terminated.

27. The method of claim 25, further comprising establishing a connection between the user terminal and at least one different user terminal, when the connection between the user terminal and the display apparatus is established.

28. The method of claim 27, further comprising, when the connection with the different user terminal is established, transmitting a predetermined content from the user terminal to the different user terminal or transmitting the predetermined content from the different user terminal to the user terminal.

29. The method of claim 25, further comprising receiving a control request of the state adjusting device from the display apparatus,
    wherein controlling the state adjusting the device includes controlling the state adjusting device to adjust the state of the peripheral device according to the control request.

30. The display system of claim 1, wherein the type of the display apparatus comprises at least one of a projector and an electronic blackboard.

31. The display system of claim 1, wherein an initial brightness level of the peripheral device is determined differently depending on the type of the display apparatus.

* * * * *